United States Patent
Bazin et al.

(10) Patent No.: US 9,497,159 B2
(45) Date of Patent: Nov. 15, 2016

(54) SYSTEM AND METHOD FOR IP NETWORK SEMANTIC LABEL STORAGE AND MANAGEMENT

(71) Applicant: BLUECAT NETWORKS INC., Toronto (CA)

(72) Inventors: Guillaume Yves Bernard Bazin, Richmond Hill (CA); Richard Nigel Hyatt, Markham (CA); Steven Philip Meyer, Richmond Hill (CA)

(73) Assignee: BLUECAT NETWORKS INC., Toronto, Ontario (CA)

( * ) Notice: Subject to any disclaimer, the term of this patent is extended or adjusted under 35 U.S.C. 154(b) by 323 days.

(21) Appl. No.: 14/101,964

(22) Filed: Dec. 10, 2013

(65) Prior Publication Data

US 2014/0181274 A1 Jun. 26, 2014

Related U.S. Application Data

(60) Provisional application No. 61/735,187, filed on Dec. 10, 2012.

(51) Int. Cl.
*H04L 29/12* (2006.01)

(52) U.S. Cl.
CPC ....... *H04L 61/2015* (2013.01); *H04L 61/6068* (2013.01); *H04L 61/1511* (2013.01)

(58) Field of Classification Search
CPC ........... H04L 61/2015; H04L 61/1511; H04L 61/6068
See application file for complete search history.

(56) References Cited

U.S. PATENT DOCUMENTS

| 8,850,066 B2 * | 9/2014 | Patel ................. | H04L 29/12311 709/245 |
| 8,862,735 B1 * | 10/2014 | Singh ..................... | H04L 63/20 709/221 |
| 2002/0083198 A1 * | 6/2002 | Kim .................. | H04L 29/12066 709/245 |
| 2005/0021841 A1 * | 1/2005 | Yoshimoto ........ | H04L 29/12066 709/238 |
| 2009/0132561 A1 * | 5/2009 | Cormode .......... | G06F 17/30958 |
| 2011/0145239 A1 * | 6/2011 | Newman ........... | G06F 17/30557 707/737 |
| 2011/0282979 A1 * | 11/2011 | Bower, III ........ | H04L 29/12283 709/222 |
| 2012/0089713 A1 * | 4/2012 | Carriere .............. | H04L 12/4641 709/222 |
| 2014/0089524 A1 * | 3/2014 | Carriere .............. | H04L 12/4641 709/245 |

OTHER PUBLICATIONS

A. Main "Textual Representation of IPv4 and IPv6 Addresses", Network Working Group, <http://tools.ietf.org/pdf/draft-main-ipaddr-text-rep-00.pdf>, May 2003, pp. 1-11.*

Patent Cooperation Treaty, Written Opinion and International Search Report dated Mar. 6, 2014, issued on PCT Application No. PCT/CA2013/001022.

(Continued)

*Primary Examiner* — Michael C Lai
(74) *Attorney, Agent, or Firm* — Norton Rose Fulbright Canada LLP; Maya Medeiros

(57) ABSTRACT

Embodiments described herein provide devices, methods, and systems for managing IPv6 and IPv4 addresses within an IP address management (IPAM) system, wherein various subnets are associated with administrator-defined names, which are semantic labels. Such semantic labels may be combined to yield the IP addresses in a user-friendly manner.

6 Claims, 15 Drawing Sheets

(56) References Cited

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 8)", 3GPP Standard; 3GPP TS 23A01, 3rd Generation Partnership Project (3GPP), Mobile Competence Centre ; 650, Route Des Lucioles ; F-06921 Sophia-Antipolis Cedex ; France, No. V8.0.0, Dec. 1, 2007 (Dec. 1, 2007), pp. 1-167, XP050363622, see pp. 38-45.

Andrew Main, "Textual Representation of IPv4 and IPv6 Addresses", Network Working Group, Black Ops Ltd., Nov. 2003, pp. 1-11.

* cited by examiner

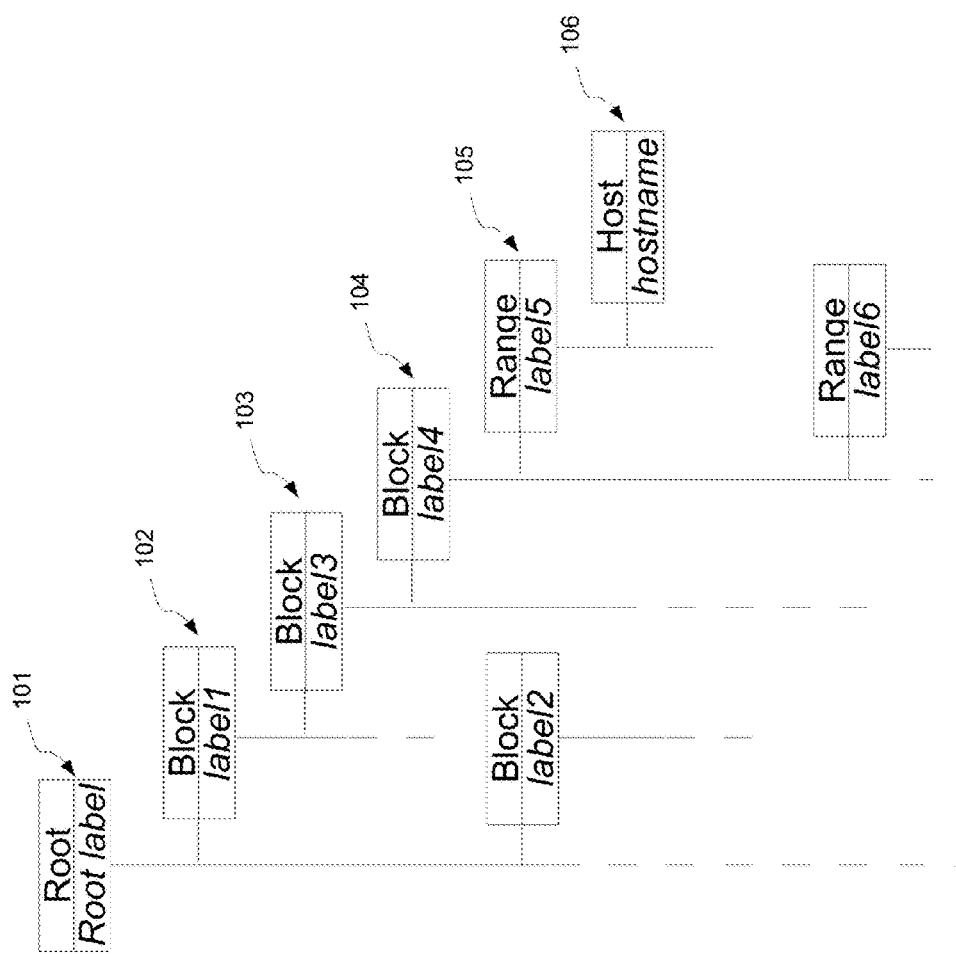
Fig. 1 : IP Address hierarchy

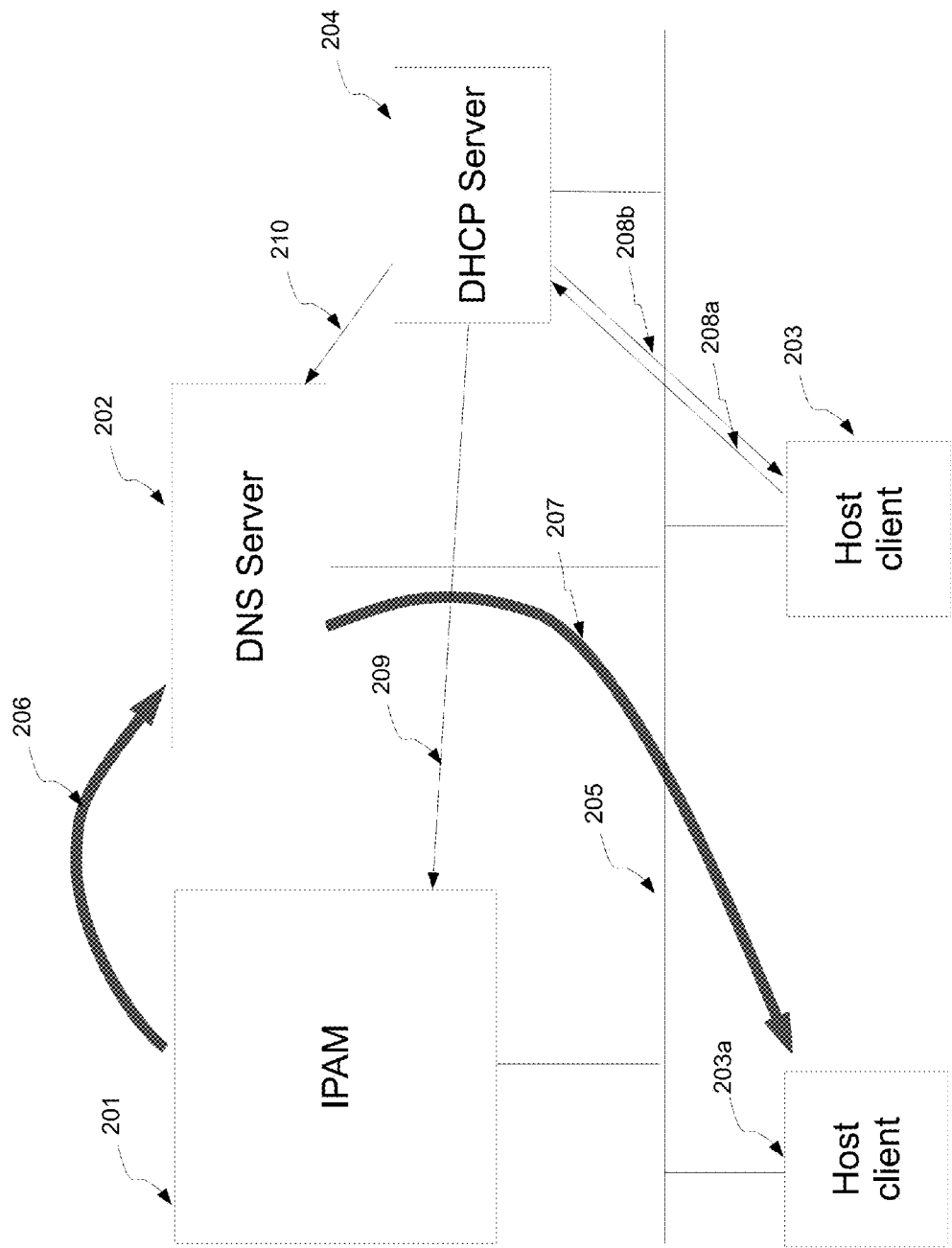
Fig. 2 : Network components

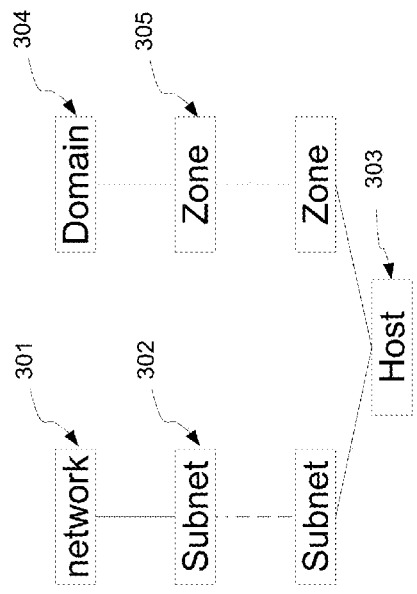
Fig. 3 : Network subnets and DNS zones
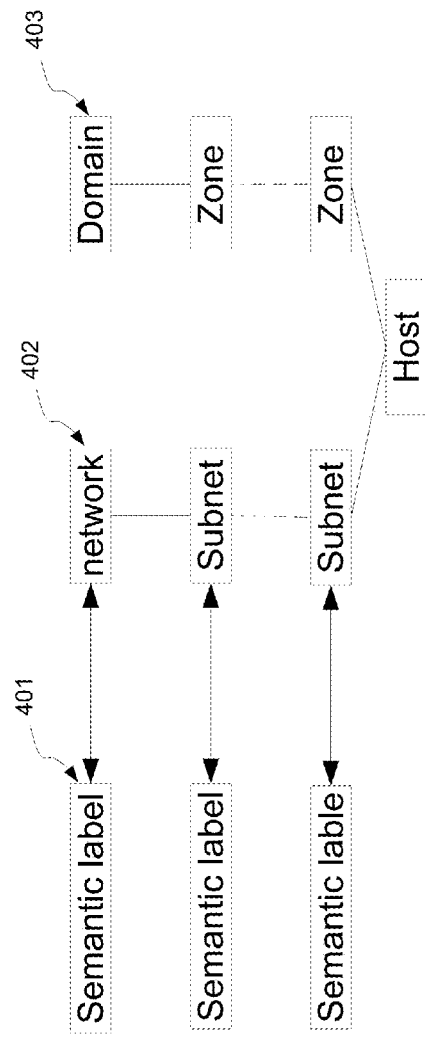
Fig. 4 : Network aliases associated with subnets

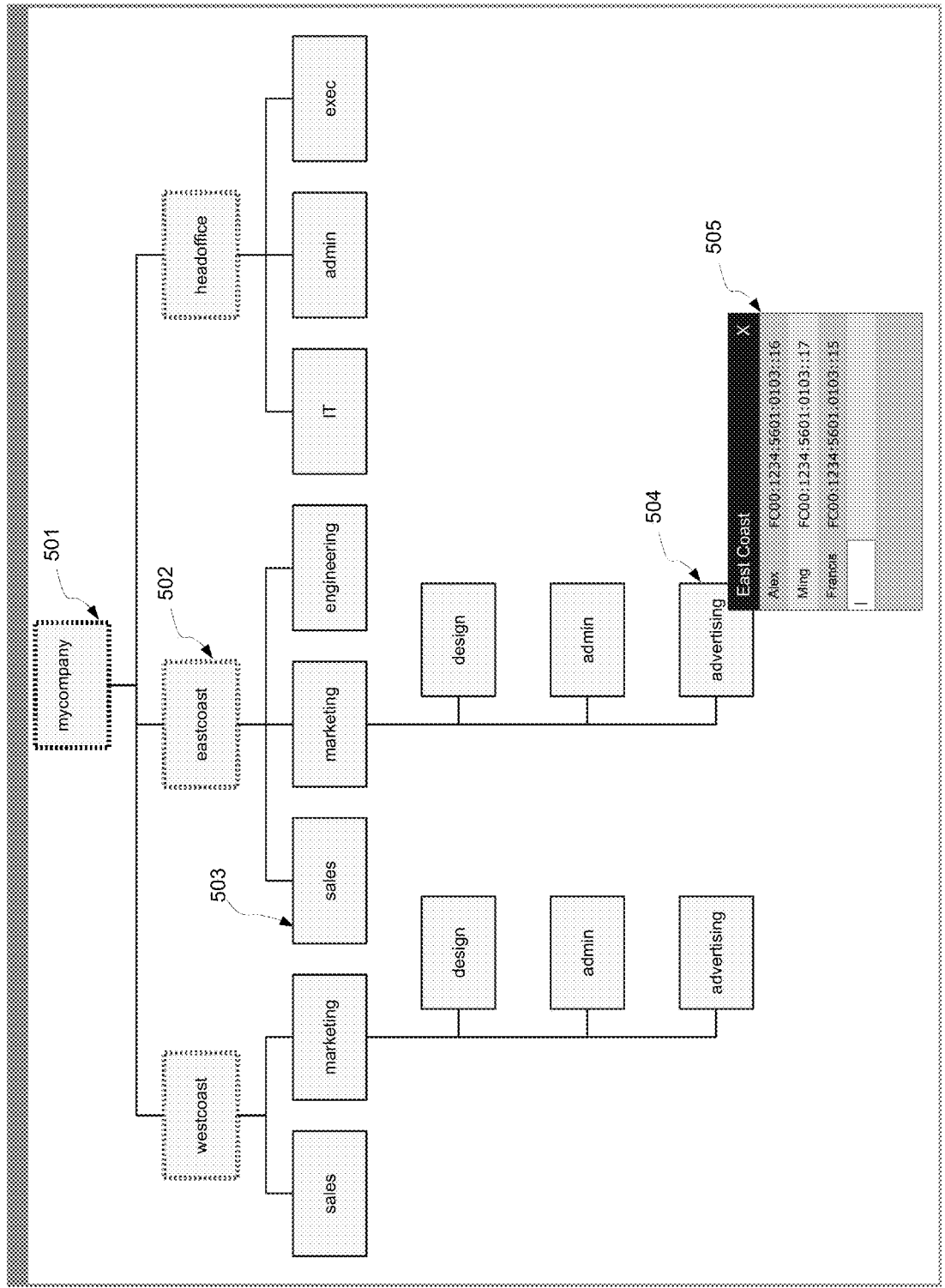
Fig. 5 : Example Organization Chart with Automatic Network Configuration

```
*.1.0.1.0.1.0.6.5.4.3.2.1.0.0.C.F IN TXT {['role':'design','department':'marketing','location':'eastcoast','organization':'mycompany']}
*.2.0.1.0.1.0.6.5.4.3.2.1.0.0.C.F IN TXT {['role':'advertising','department':'marketing','location':'eastcoast','organization':'mycompany']}
*.4.0.1.0.1.0.6.5.4.3.2.1.0.0.C.F IN TXT {['role':'administration','department':'marketing','location':'eastcoast','organization':'mycompany']}

*.1.0.1.0.1.0.6.5.4.3.2.1.0.0.C.F   IN   TXT   {['design','marketing','eastcoast','mycompany']}
*.2.0.1.0.1.0.6.5.4.3.2.1.0.0.C.F   IN   TXT   {['advertising','marketing','eastcoast','mycompany']}
*.4.0.1.0.1.0.6.5.4.3.2.1.0.0.C.F   IN   TXT   {['administration','marketing','eastcoast','mycompany']}
```

Fig. 6 : Illustration of Structured Data Records in DNS

```
"6","17:55:13.125871","fc00:1234:5601:0101:d4cd:b902:4729:50de","fc00:1234:5601:0101:d4e4:7197:4f21:eef3","RTSP","OPTIONS rtsp://[fc00:1234:5601:0101:d4e4:7197:4f21:eef3]/live4.sdp RTSP/1.0"

"7","17:55:13.126245","fc00:1234:5601:0101:d4e4:7197:4f21:eef3","fc00:1234:5601:0101:d4cd:b902:4729:50de","TCP","rtsp > 51985 [ACK] Seq=1 Ack=125 Win=5840 Len=0"

"8","17:55:13.127496","fc00:1234:5601:0101:d4e4:7197:4f21:eef3","fc00:1234:5601:0101:d4cd:b902:4729:50de","RTSP","Reply: RTSP/1.0 200 OK"
```

Fig. 7 : Illustration of Prior Art Log records

```
"6","17:55:13.125871",":mycompany:eastcoast:marketing:design:d4cd:b902:4729:50de",":mycompany:eastcoast:marketing:design:testnode","RTSP","OPTIONS rtsp://[:mycompany:eastcoast:marketing:design:testnode]/live4.sdp RTSP/1.0"

"7","17:55:13.126245",":mycompany:eastcoast:marketing:design:testnode",":mycompany:eastcoast:marketing:design:d4cd:b902:4729:50de","TCP","rtsp > 51985 [ACK] Seq=1 Ack=125 Win=5840 Len=0"

"8","17:55:13.127496",":mycompany:eastcoast:marketing:design:testnode",":mycompany:eastcoast:marketing:design:d4cd:b902:4729:50de","RTSP","Reply: RTSP/1.0 200 OK"
```

Fig. 8 : Illustration of Log records using Semantic Labels

> mycompany

IPv6 admin
eastcoast:marketing:admin
headoffice:admin
westcoast:marketing:admin

Addresses  DHCP Ranges   IP Groups

IP Addresses

| IP Addresses | State |
|---|---|
| westcoast:marketing:admin::1 [FC00:1234:5601:0222::1] | Static |
| westcoast:marketing:admin::2 [FC00:1234:5601:0222::2] | Static |
| westcoast:marketing:admin::4356 [FC00:1234:5601:0222::4356] | DHCP Reserved |
| westcoast:marketing:admin::4357 [FC00:1234:5601:0222::4357] | DHCP Reserved |
| westcoast:marketing:admin::4358 [FC00:1234:5601:0222::4358] | DHCP Reserved |
| westcoast:marketing:admin::1d34:301 [FC00:1234:5601:0222::1d34:301] | Dynamic |
| westcoast:marketing:admin::1:323:4004 [FC00:1234:5601:0222::323:4004] | Dynamic |

Fig. 9 : Example: Using Semantic Labels to Display Selected Addresses

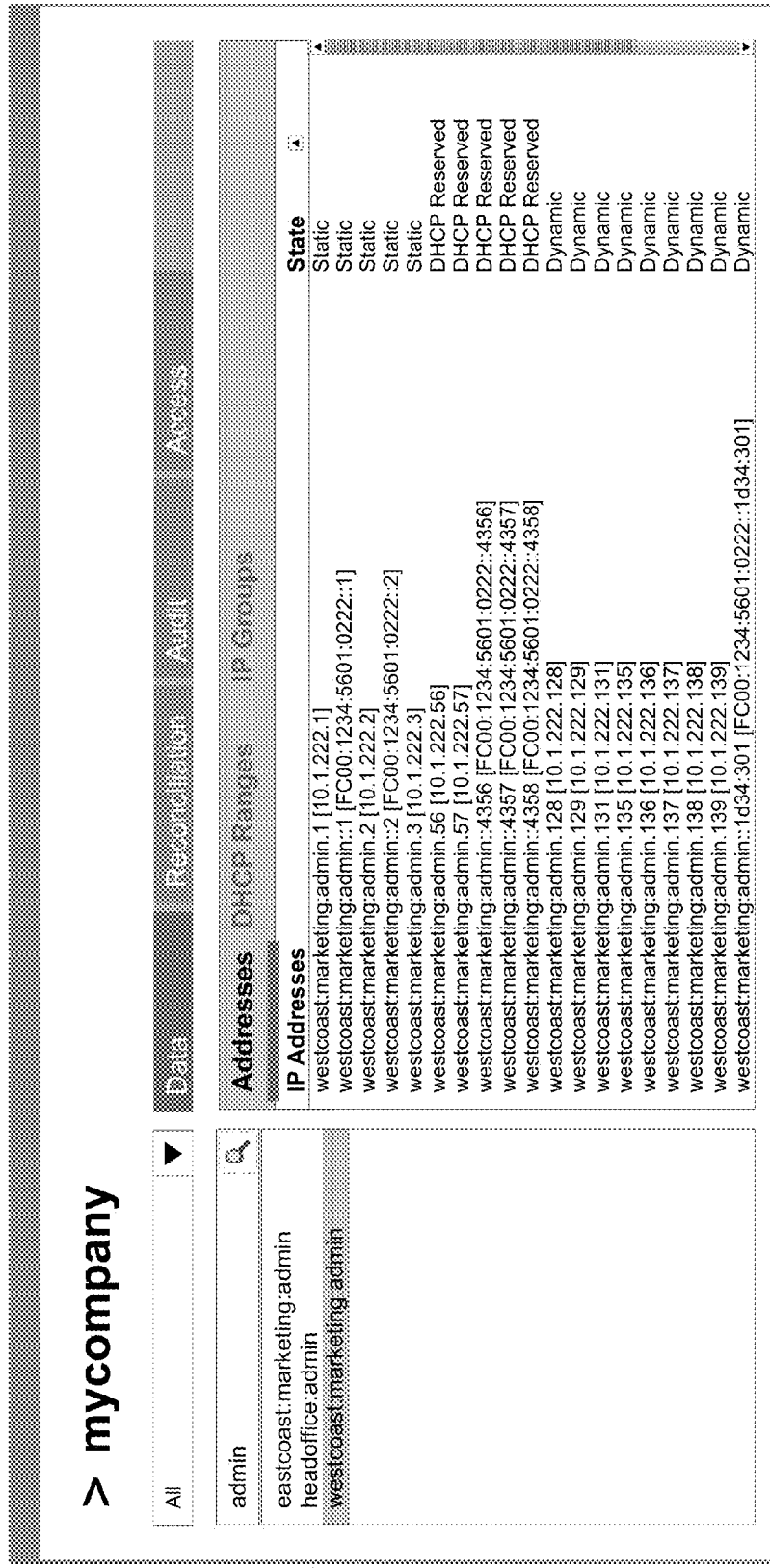
Fig. 10 : Example: Using Semantic Labels to Display All Addresses

| IP Addresses | State |
|---|---|
| westcoast:marketing:admin. [10.1.222.1] | Static |
| westcoast:marketing:admin::1 [FC00:1234:5601:0222::1] | Static |
| westcoast:marketing:admin.2 [10.1.222.2] | Static |
| westcoast:marketing:admin::2 [FC00:1234:5601:0222::2] | Static |
| westcoast:marketing:admin.3 [10.1.222.3] | Static |
| westcoast:marketing:admin.desktops [10.1.222.56] | DHCP Reserved |
| westcoast:marketing:admin.desktops [10.1.222.57] | DHCP Reserved |
| westcoast:marketing:admin:desktops [FC00:1234:5601:0222::4356] | DHCP Reserved |
| westcoast:marketing:admin:desktops [FC00:1234:5601:0222::4357] | DHCP Reserved |
| westcoast:marketing:admin:desktops [FC00:1234:5601:0222::4358] | DHCP Reserved |
| westcoast:marketing:admin.dhcp [10.1.222.128] | Dynamic |
| westcoast:marketing:admin.dhcp [10.1.222.129] | Dynamic |
| westcoast:marketing:admin.dhcp [10.1.222.131] | Dynamic |
| westcoast:marketing:admin.dhcp [10.1.222.135] | Dynamic |
| westcoast:marketing:admin.dhcp [10.1.222.136] | Dynamic |
| westcoast:marketing:admin.dhcp [10.1.222.137] | Dynamic |
| westcoast:marketing:admin.tablets [10.1.222.91] | Dynamic |
| westcoast:marketing:admin.dhcp6 [FC00:1234:5601:0222::1d34:301] | Dynamic |
| westcoast:marketing:admin:tablets [FC00:1234:5601:0222::1d34:801] | Dynamic |

Fig. 11 : Example: Using Semantic Labels (including Ranges) to Display All Addresses

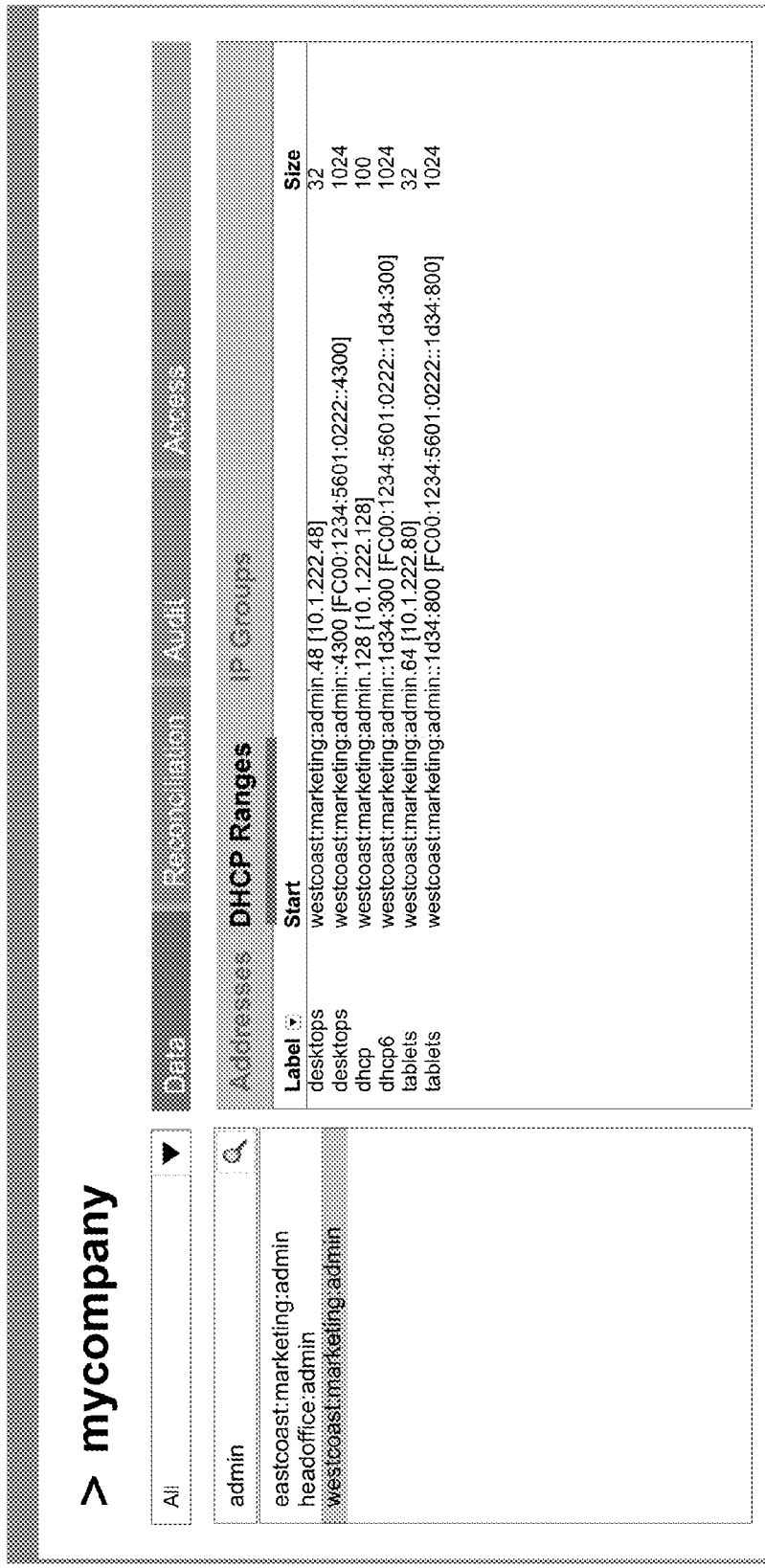
Fig. 12 : Example: Using Semantic Labels to Display DHCP Ranges

1300

```
┌─────────────────────┐
│  Defining a root block │  1302
└─────────────────────┘
           │
           ▼
┌─────────────────────┐
│ Defining subnet blocks │  1304
└─────────────────────┘
           │
           ▼
┌─────────────────────┐
│  Generating a network │
│   hierarchy model by  │  1306
│  nesting subnet blocks │
└─────────────────────┘
           │
           ▼
┌─────────────────────┐
│  determining subnet   │
│  groups for allocating │  1308
│  individual addresses │
└─────────────────────┘
           │
           ▼
┌─────────────────────┐
│ allocating the addresses │
│ to subnet groups to form │  1310
│    a subnet suffix    │
└─────────────────────┘
           │
           ▼
┌──────────────────────────────────────────────────┐
│ Determining a subnet semantic prefix and combining the │
│ subnet suffix and subnet semantic prefix to compose the │  1312
│                 semantic label                   │
└──────────────────────────────────────────────────┘
           │
           ▼
┌─────────────────────┐
│  combining one or more │
│    semantic labels to   │
│ generate one or more IP │  1314
│       addresses        │
└─────────────────────┘
```

```
┌─────────────────────────┐
│ automatically identifying│    1502
│ an IP address segment    │
└─────────────────────────┘
             │
             ▼
┌─────────────────────────┐
│ querying a persistent   │    1504
│ data store for the IP   │
│ address                 │
└─────────────────────────┘
             │
             ▼
┌─────────────────────────┐
│ receiving a semantic label│  1506
│ representation of the IP address│
│ segment from the persistent data│
│ store                   │
└─────────────────────────┘
             │
             ▼
┌─────────────────────────┐
│ automatically replacing the IP│  1508
│ address segment in context with│
│ the semantic label representation│
└─────────────────────────┘
```

```
receiving the IP address     1602
of the client
        |
        v
querying a persistent        1604
data store for the IP
address
        |
        v
receiving a semantic label   1606
representation of the IP address
segment from the persistent data
store
        |
        v
determining the group from the   1608
semantic label
```

```
defining a network routing rule using one or more
semantic label expressions to represent source and    1702
destination network addresses and subnets
```

↓ querying a data store for the semantic labels — 1704

↓ receiving the network address and subnet representations of the semantic labels from the data store — 1706

↓ substituting the network addresses and subnets for the semantic labels in the rule — 1708

↓ implementing the rule in the firewall — 1710

FIG. 17

SYSTEM AND METHOD FOR IP NETWORK SEMANTIC LABEL STORAGE AND MANAGEMENT

FIELD

Embodiments described herein relate generally to the field of computer networking and more particularly to Internet Protocol Address Management or IP Address Management (IPAM).

INTRODUCTION

Network management of Internet Protocol (IP) devices may be directed to the hierarchical structure and modeling of networks. For example, the hierachical structure of networks, subnets, and subnets of subnets, etc. This modeling is aligned with the allocation of address prefixes and subnet masks in an IPv4 addressing structure. Due to the 32-bit limitation of the IPv4 addressing space, the allocation of subnets may be optimized.

IPv4 addresses, as specified in RFC 791 (1981), may be expressed as a combination of 4 decimal numbers separated by a dot (.) between each number. For example, such as "1.2.3.4". Each number represents 8 bits in the 32-bit address. The subnet mask may be represented in the same format, namely as a sequence of binary '1's followed by a sequence of '0's. For example, such as "255.255.0.0". The sequence is such that when ANDed with the subnet address the significant bits of the subnet address will be isolated.

An alternate means of expressing the subnet mask is to identify the number of '1's in the subnet mask. For example, "255.255.0.0" is expressed as /16, "255.240.0.0" as /12, etc. The subnet addresses may therefore be expressed, for example, as "1.96.0.0/12" or "1.99.25.0/24".

The management of IPv6 addresses involves dealing with numbers that are significantly larger than those encountered in IPv4 addresses. IPv6 addresses are typically expressed as 8 hexadecimal numbers of 16 bits, each separated by a colon (:). As an example, an address may be expressed as; "FC00: 1234:5644:5566:7788:99AA:BBCC:DDEE".

IPv6 addresses are divided into a network prefix and an Interface identifier. The network prefix is usually restricted to the first 64 bits (i.e. The first 4 16-bit numbers) and the interface identifier comprises the balance of the bits. A subnet address may, for example, be expressed as: "FC00: 1234:5644:5500::156".

Users experience two consequences of IPv6 addresses: (a) there are significantly more available ways to designate subnets within the 64-bit range than there are for IPv4 addresses, and (b) IPv6 addresses are significantly more difficult to remember and are more prone to incorrect entry, in particular due to human error.

Network addresses are used in a number of ways. Apart from the initial requirement of associating a unique network identifier to a communicating participant, addresses are used to control routing of messages. For example, routing rules are utilized to control the routing of messages. Addresses are also used to control access permissions for messages. For example, firewall rules may be utilized to control access permissions for messages. Addresses may also be used to track activity, diagnose problems and audit user operations.

Domain Name System (DNS) server entries are used to relate host computer names to their respective network addresses and vice-versa, but presently there is no easy way to: (a) derive network structure from these addresses; (b) access information from these addresses; or (c) determine the relationships between IPv4 and IPv6 addresses. These difficulties were recognized in RFC 1101 DNS Encoding of Network Names and Other Types, P. Mockapetris, April 1989, for example. Attempts have been made to map names to network prefixes in RFC 3123 A DNS RR Type for Lists of Address Prefixes (APL RR), P. Koch, June 2001, for example. However, little progress has been made in adopting this capability.

Internet Protocol Address Management (IPAM) systems may: (a) manage the segmentation of networks into subnets, taking into account the limitation of the IPv4 address format; and (b) define address pools from which addresses may be allocated to hosts. In addition, the domain names assigned to the hosts and the domains created for them may also managed by the IPAM.

Significant new complexity has been added to IPAM because existing IPv4 networks are moving to also support IPv6 networks. In addition, new IPv6 networks may be created to take advantage of increased network addressing flexibility. There exists a need for an IPAM capable of managing IPv6 networks and addresses in an efficient manner, or at least an alternative. There exists a need for systems, devices and methods with improved subnets design, designation, and management, or at least an alternative.

SUMMARY

In one aspect, the present disclosure relates to a method for managing IPv6 and IPv4 addresses within an IP address management (IPAM) system by associating each of one or more subnets with one or more semantic labels, said method comprising the following steps: defining the root block; defining one or more subnet blocks; layering the one or more subnet blocks to a plurality of levels; determining one or more subnet groups for allocating one or more individual addresses and allocating the one or more addresses to said determined one or more subnet groups; and determining a subnet semantic label for a block, to be known as a semantic prefix, and combining the one or more semantic prefixes, thereby composing the semantic label of the IP address, said subnet semantic prefixes being distinguishable from numbers of the one or more individual addresses.

In accordance with some embodiments, the method may further comprise the step of combining one or more semantic labels to derive one or more IP addresses. The method may also comprise the step of obtaining the semantic labels by referencing the one or more IP addresses using a lookup facility.

The method may further comprise the step of composing the subnet prefix to contain a letter which is a) not in the [0-9a-fA-F] range or b) starts with a reserved identifier, for example the character '$' or ':'.

In another aspect, embodiments described herein may provide an IPAM system for managing IPv6 and IPv4 addresses by associating each of one or more subnets with a network alias, the system may involve: IPAM server configured to: define a root block; define one or more subnet blocks; generate a network hierarchy model by layering the one or more subnet blocks to a plurality of levels; determine one or more subnet groups for allocating one or more individual addresses; allocate the one or more addresses to the determined one or subnet groups to form a subnet suffix; and determine a subnet prefix and combining the subnet suffix and subnet prefix, wherein the subnet prefix precedes the subnet suffix and thereby generating the network alias, said subnet prefix being distinguishable from numbers of the one or more individual addresses; Domain Name Server configured to record an association between the network aliases and the subnet addresses; DHCP Server to provision IP addresses to network clients; Network clients, wherein the network clients, once provisioned, are configured to send network messages to Host clients, wherein the network clients are associated with the subnet groups; and Host clients configured to perform DNS lookups on the IP addresses of the network clients to obtain network aliases for the subnet groups of the network clients.

In accordance with some embodiments, the subnet semantic prefix contains a letter which is a) not in the [0-9a-fA-F] range or b) starts with a reserved identifier to identify this as a semantic prefix, such as the character '$' or ':'.

In another aspect, embodiments described herein may provide a method for managing IPv6 and IPv4 addresses within an IPAM system by associating each of one or more subnets with a semantic label, said method comprising the following steps: defining a root block; defining one or more subnet blocks; generating, using a processor, a network hierarchy model by layering the one or more subnet blocks to a plurality of levels; storing the root block, the one or more subnet blocks, and network hierarchy model at a persistent data store; determining, using the processor, one or more subnet groups for allocating one or more individual addresses; allocating the one or more addresses to the determined one or subnet groups to form a subnet suffix; determining, using the processor, a subnet semantic prefix and combining the subnet suffix and subnet semantic prefix, so that the subnet semantic prefix precedes the subnet suffix and thereby composing the semantic label, the subnet semantic prefix being distinguishable from numbers of the one or more individual addresses; and receiving, using receiver, network messages from network clients for host clients, wherein the network messages and the semantic labels may be used to perform Domain Name Server (DNS) lookups for identification of network hardware resources.

In accordance with some embodiments, the method may further involve the step of combining one or more semantic labels to generate one or more IP addresses, wherein the DNS lookups may be performed on the one or more IP addresses.

In accordance with some embodiments, the method may further involve the step of composing the subnet semantic prefix to contain a letter which is a) not in the [0-9a-fA-F] range or b) starts with a reserved identifier to identify this as a semantic prefix, such as the character '$' or ':'.

In accordance with some embodiments, the method may further involve the step of generating the subnet semantic prefix distinct from an IP address.

In accordance with some embodiments, more than one semantic label generates the same IP address.

In accordance with some embodiments, one semantic label is an absolute semantic label that generates the IP address.

In accordance with some embodiments, a concatenation of relative semantic labels generates the IP address.

In another aspect, embodiments described herein may provide a method to restructure existing IPv4 networks and migrating to IPv6 networks within an IPAM system the method may involve the following steps: generating, using a processor, a semantic hierarchy independent of network addresses into branch and leaf nodes; assigning a semantic label to each node in the hierarchy; storing the semantic labels and the hierarchy in a persistent data store; matching each node with an existing IPv4 subnet and creating a new subnet when one does not already exist; matching existing known host devices with leaf nodes of the hierarchy; reassigning, using the processor, host devices to leaf nodes according to rules based on the new semantic hierarchy; determining, using the processor, the network address of the IPv6 root block and associating it with the root node; generating, using the processor, IPv6 subnets and host address definitions corresponding to the node hierarchy; storing the IPv6 subnets at the persistent data store; and deploying host address definitions to DHCP and DHCPv6 servers.

In accordance with some embodiments, the method may further involve the step of creating domain names for the subnets and hosts to reflect the semantic labels and deploying the domain names to a DNS server.

In another aspect, embodiments described herein may provide a system or device to restructure existing IPv4 networks and migrate to IPv6 networks, the system or device may integrate within an IPAM system and may involve the following steps: a processor configured to generate a semantic hierarchy independent of network addresses into branch and leaf nodes, and assign a semantic label to each node in the hierarchy; a persistent data store for storing the semantic labels and the hierarchy; wherein the processor is configured to match each node with an existing IPv4 subnet references network hardware resources and create a new subnet when one does not already exist, match existing known host devices with leaf nodes of the hierarchy; reassign host devices to leaf nodes according to rules based on the new semantic hierarchy; determine the network address of the IPv6 root block and associating it with the root node; generate IPv6 subnets and host address definitions corresponding to the node hierarchy; and deploy host address definitions to DHCP and DHCPv6 servers. The persistent data store may also store the IPv6 subnets.

In another aspect, embodiments described herein may provide a method to represent network addresses in human readable format as semantic labels, the method may involve: automatically identifying, using a processor, an IP address segment; querying a persistent data store for the IP address; receiving, using a receiver, a semantic label representation of the IP address segment from the persistent data store; automatically replacing, using the processor, the IP address segment in context with the semantic label representation.

In another aspect, embodiments described herein may provide a system or device configured to represent network addresses in human readable format as semantic labels. The system may include a processor, a receiver, a transmitter, and a persistent data store, the processor may be configured to automatically identify an IP address segment; query the persistent data store for the IP address; receive, using a receiver, a semantic label representation of the IP address segment from the persistent data store; automatically replace the IP address segment in context with the semantic label representation; and transmit data using the transmitter to different network resources regarding the semantic labels.

In accordance with some embodiments, the persistent data store is a DNS server.

In accordance with some embodiments, the IP address segment represents an IPv4 subnet.

In accordance with some embodiments, the IP address segment represents an IPv6 subnet.

In another aspect, embodiments described herein may provide a method to identify the group to which a network client belongs, the method may involve: receiving, at a receiver, the IP address of the client; querying a persistent data store for the IP address; receiving, at the receiver, the semantic label representation of the IP address from the persistent data store; determining, using the processor, the group from the semantic label.

In another aspect, embodiments described herein may provide a system or device to identify the group to which a network client device belongs. The system may include a processor, a receiver, a transmitter, and a persistent data store, the processor may be configured to receive, at the receiver, the IP address of the client device; query the persistent data store for the IP address; receiving, at the receiver, the semantic label representation of the IP address from the persistent data store; determining, using the processor, the group from the semantic label, and transmit data using the transmitter to different network resources regarding the group(s).

In accordance with some embodiments, the group determines which content information may be returned to the client device according to rules associated with the group.

In accordance with some embodiments, the group determines which services may be made available to the client according to rules associated with the group.

In another aspect, embodiments described herein may provide a method to implement network administration rules for firewall routing, the method may involve: defining, using a processor, a network routing rule using one or more semantic label expressions to represent source and destination network addresses and subnets; querying a data store for semantic labels; receiving, using a receiver, network addresses and subnet representations of the semantic labels from the data store; substituting, using the processor, the network addresses and the subnet representations for the semantic labels in the rule; implementing the rule in a firewall device.

In another aspect, embodiments described herein may provide a system or device to implement network administration rules for firewall routing, the system may involve a processor, a receiver, a transmitter, and a persistent data store, where the processor may be configured to define a network routing rule using one or more semantic label expressions to represent source and destination network addresses and subnets; query the data store for semantic labels; receive, using the receiver, network addresses and subnet representations of the semantic labels from the data store; substitute the network addresses and the subnet representations for the semantic labels in the rule; transmit, using the transmitter, the rule in a firewall device; and implement the rule in a firewall device.

In another aspect, embodiments described herein may provide a method of using a DHCP server to provision a client network IP address to map to a semantic label, the method comprising: identifying at least one distinct attribute of a client network device used for address provisioning; associating the at least one distinct attribute with a subnet address; specifying a set of at least one semantic label for the subnet address; recording the association between the semantic labels and the subnet in a persistent data store; receiving at a DHCP server a request for an IP address from a requesting client network device; identifying at least one distinct attribute of the requesting client network device; determining the at least one semantic label from the at least one attribute; querying the persistent data store for the semantic labels; receiving the subnet addresses of the semantic labels from the persistent data store; determining an address pool with the subnet addresses; and provisioning an address from the address pool to the requesting client network device.

In another aspect, embodiments described herein may provide a system or device for using a DHCP server to provision a client network IP address to map to a semantic label, the system may involve a processor, a receiver, a transmitter, and a persistent data store, where the processor may be configured to identify at least one distinct attribute of a client network device used for address provisioning; associate the at least one distinct attribute with a subnet address; specify a set of at least one semantic label for the subnet address; record the association between the semantic labels and the subnet in a persistent data store; receive at a DHCP server a request for an IP address from a requesting client network device; identify at least one distinct attribute of the requesting client network device; determine the at least one semantic label from the at least one attribute; query the persistent data store for the semantic labels; receive the subnet addresses of the semantic labels from the persistent data store; determine an address pool with the subnet addresses; and provision, using the receiver, an address from the address pool to the requesting client network device. The transmitter may be used to transmit network data to the DHCP server to provision client network IP addresses.

In this respect, before explaining at least one embodiment in detail, it is to be understood that the embodiment(s) is not limited in its application to the details of construction and to the arrangements of the components set forth in the following description or illustrated in the drawings. Other embodiments may be practiced and carried out in various ways. Also, it is to be understood that the phraseology and terminology employed herein are for the purpose of description and should not be regarded as limiting.

BRIEF DESCRIPTION OF THE DRAWINGS

Embodiments may be better understood and objects may become apparent when consideration is given to the following detailed description thereof. Such description makes reference to the annexed drawings wherein:

FIG. 1 shows a block diagram of an IP address hierarchy according to some embodiments.

FIG. 2 shows a block diagram of network components according to some embodiments.

FIG. 3 shows a block diagram of network subnets and DNS domains according to some embodiments.

FIG. 4 shows a block diagram of semantic labels associated with subnets according to some embodiments.

FIG. 5 shows a block diagram of an organizational chart with automatic network configuration according to some embodiments.

FIG. 6 is an illustration of a structured data record store in DNS according to some embodiments.

FIG. 7 is an illustration of prior art log records.

FIG. 8 is an illustration of log records converted by using semantic labels according to some embodiments.

FIG. 9 shows an illustration of a screen display that uses semantic labels to display addresses of a selected type to the user according to some embodiments.

FIG. 10 shows an illustration of a screen display that uses semantic labels to display addresses of different types to the user according to some embodiments.

FIG. 11 shows an illustration of a screen display that uses semantic labels to display addresses and ranges to the user according to some embodiments.

FIG. 12 shows and illustration of a screen display that shows semantic labels associated with address ranges according to some embodiments.

FIGS. 13 to 18 illustrate flow charts according to some embodiments.

Figure 14:
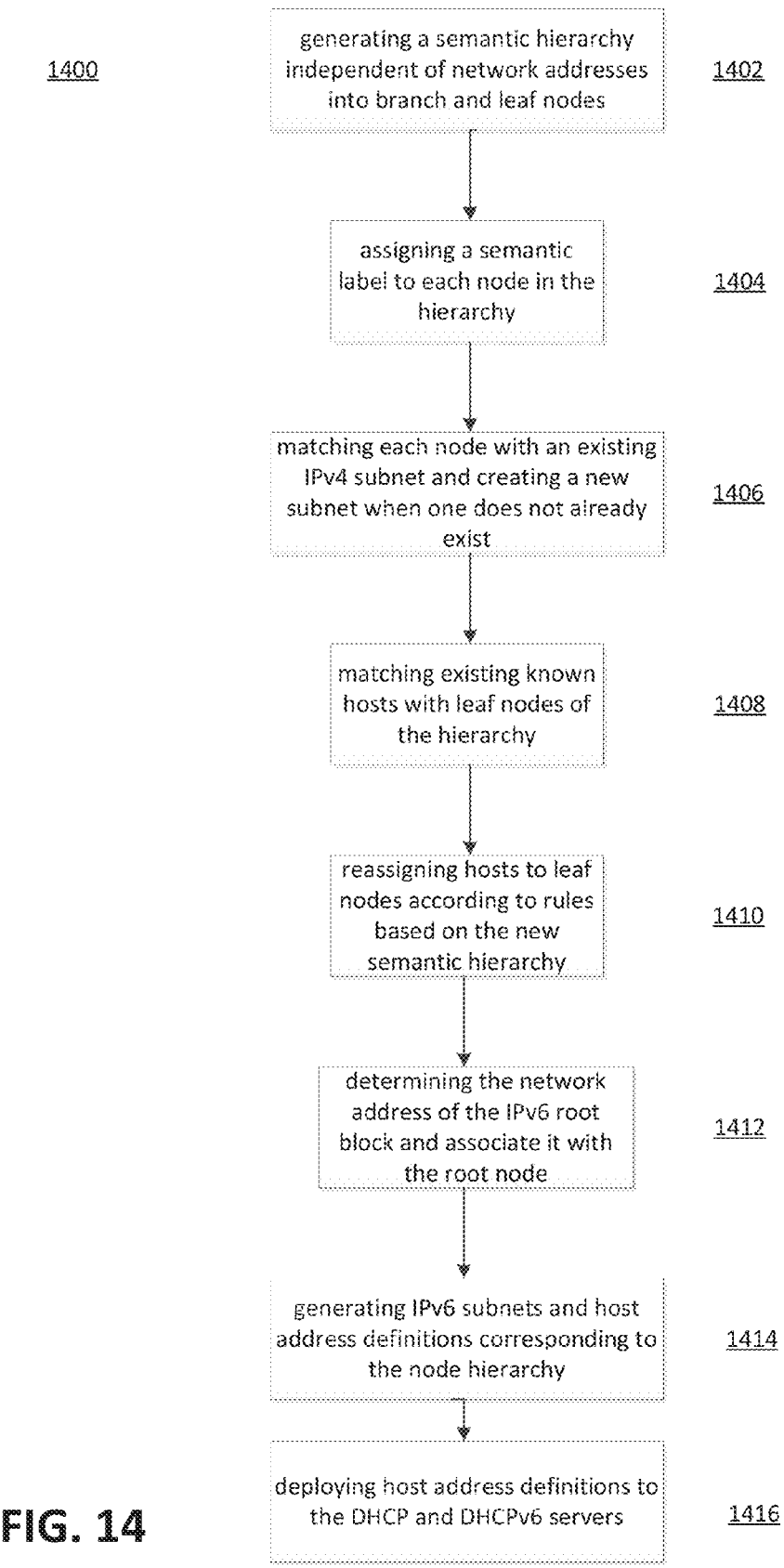

In the drawings, embodiments are illustrated by way of example. It is to be expressly understood that the description and drawings are only for the purpose of illustration and as an aid to understanding, and are not intended as a definition of the limits of the embodiments.

DETAILED DESCRIPTION OF VARIOUS EMBODIMENTS

Embodiments described herein may provide methods, devices, and systems for managing IPv6 and IPv4 addresses within an IP address management (IPAM) system, wherein various subnets may be associated with administrator-defined names, that are semantic labels. A subnet may be a logical grouping, segmentation or division of a network. The semantic labels may be combined to yield the IP addresses in a user-friendly manner. Embodiments described herein may leverage the discovery that the use of such semantic labels can provide improved network addressing, as described herein. Furthermore, embodiments described herein may provide particular mechanisms for permitting use of semantic labels in connection with IPAM, as described.

Semantic labels may be easily distinguishable from hexadecimal numbers. Therefore semantic labels may a) contain at least one letter that is not in the [0-9a-fA-F] range, for example, 'adder1' is a legal semantic label, but 'added1' is not or b) start with a reserved identifier, such as the character '$' or ':', to unambiguously identify a semantic label, for example, '$added1' or ':added1'. Therefore a machine may automatically distinguish a semantic label from an IP address based on the rules for defining semantic labels.

In IPAM systems, network addresses may be defined in a hierarchy. The topmost element of the hierarchy, namely the root, may be defined by the subnet address supplied by the Internet Service Provider (ISP). For example, the root may be a subnet address such as /8, to /16 (IPv4) or /32, /40 or /48 (IPv6) subnet prefix. Below the root there may be any of the following: zero; one; or a plurality of subnet blocks arranged in an hierarchy. The subnet blocks may or may not correspond to the real routing topology used in the network. Below the subnets there may be one subnet range, or a plurality of subnet ranges, corresponding to the real and/or virtual networks that hand out real IP addresses to clients on the network.

Semantic labels describe the network hierarchy in two ways, namely as relative or absolute labels. Relative semantic labels may be concatenated to represent the full address, for example; 'mycompany:marketing:advertising::1' is made up of three relative subnet prefixes. Absolute semantic labels may be prefixed by a distinctive character, for example a colon (:), and the result may represent the subnet path up to that point. As an example, the full address may be respresented by ':myadvertising::1'.

Due to the fact that IPv6 permits multiple IP addresses to be assigned to each host, the managed semantic labels of embodiments described herein may be associated with one or a plurality of Unique Local addresses [rfc4193] and/or Unique Global addresses [rfc3587]. In other embodiments, one or more semantic labels may be registered with the Domain Name System (DNS) hardware device so that such semantic labels may be referenced by network client devices beyond the IPAM service. For example, the network subnet corresponding to a semantic label ':mycompany:marketing:' may be found by querying the DNS server for 'marketing.mycompany' etc. This may permit more intuitive network addressing, and therefore may permit more efficient network management, and less errors. This is an example of a human-readable semantic label which may provide context to the network subnet associated therewith.

Domains may be registered to correspond to the desired subnet blocks from a perspective appropriate for the use of the domain names, such as the perspective of client devices connected on a local network. For example, when creating the block "marketing" the DNS domain "marketing" may be automatically registered with the DNS hardware device (e.g. server). As a further example, the domain 'design.marketing' may be automatically registered with the DNS server when creating the network group 'marketing:design'.

When looking at the domains the IPv4 and IPv6 subnet blocks and groups that have been registered with the DNS server may be apparent as resource records and may be retrieved by a DNS client device with the same perspective as the resource records, for example a client device on the local network with a local IP address.

In another aspect of embodiments described herein, a similar DNS registration may be applied to the interface identifier. The interface identifier is the lower 64-bits of the IPv6 address. For static addresses, the administrator may assign the interface identifier to a specific host, for example, such as '::1234'. The administrator may further have the system generate an interface identifier, based on an algorithm or other calculation that is designed to ensure that the output is unique. For dynamic, or temporary addresses, the interface identifier may, depending on the network configuration, be assigned by DHCP [rfc2131], DHCPv6 [rfc3315] or the host itself sometime in the future and the value may be updated in the DNS server using Dynamic DNS (DDNS) updates [rfc2136].

For static addresses, as well as dynamic or temporary addresses, a name may be assigned to the interface identifier such that the full IPv6 address may be represented. For example, ':mycompany:marketing:advertising::myname' may represent a static address, whereas ':mycompany:marketing:advertising::_temporary_' may represent a temporary address where the interface identifier part is dynamically assigned. It may be possible to register the assigned name and the current IPv6 address within DNS server. As an example, domain names that may be assigned to represent the full IPv6 address may include domain names such as 'myname.advertising.marketing.mycompany', 'myname.marketing.mycompany.com', and 'myname.mycompany.com'. As illustrated in FIG. 2, if the IP address is dynamically assigned from a predetermined pool of available addresses, then it may be associated with the chosen hostname within the DHCP server 204 upon receiving a DHCP request.

In accordance with embodiments, a computer apparatus or device may include a processor, a receiver, a transmitter, a storage device or persistent store, a network interface, and a user interface (e.g. for provision to a display device or output device), such as a graphical user interface or another type of user interface, which is designed to permit arrangements of the subnet blocks by name, where the subnet blocks refer to physical network computing resources. Arrangements of the subnet blocks may implement a discernible result of the redirection and reconfiguration of network resources. Embodiments may transform references to network resources (e.g. network addresses, IP addresses) into semantic labels for use by DNS servers to respond to addressing requests, and so on. As shown in FIG. 5, a persistent store may provide an organizational chart to model the network and the arrangement shown in the organizational chart may be utilized as a graphical representation of the arrangement of subnet blocks by name applied by the user interface.

In other embodiments, a text-based configuration definition may be integrated in the computer device. The text-based configuration definition may be operable to make use of the semantic labels. The names that are the semantic labels may be understood by the system or device as references to network computing resources.

A typical network decomposition as a hierarchy of subnets is shown in FIG. 1. Each subnet comprises an address range that includes the addresses of the subnets below. The top level root 101 is the initial block and is subdivided into zero or more blocks 102, which in turn may be subdivided into an hierarchy of zero or more levels of blocks, 103 and 104. The Range block 105 completes the network prefix and defines the range of network identifiers. Zero or more hosts 106 take up IP addresses within the range of the parent block. A label may be associated with each block and range in the network. Embodiments described herein may assign semantic labels to allow symbolic representation and manipulation of the blocks and networks.

Physical hardware network components, as shown in FIG. 2, may include IP Address Management (IPAM) Server 201, Domain Name System (DNS) Server 202, a plurality of host client devices 203, DHCP Server 204 and a network 205.

As shown in FIG. 2, embodiments of the systems, devices, and methods described herein may be implemented in hardware or software, or a combination of both. These embodiments may be implemented in computer programs executing on programmable computers, each computer including at least one processor, a receiver, a transmitter, a data storage system (including volatile memory or non-volatile memory or other data storage elements or a combination thereof), and at least one communication interface. For example, and without limitation, the various programmable computers may be a server, network appliance, virtual appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein, to transform data, and to generate output information based on the transformed data. The data may represent or reference physical, tangible network computing resources. The output information is applied to one or more output devices, in known fashion. In some embodiments, the communication interface may be a network communication interface. In embodiments in which elements of the embodiments are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, aspects of the systems, devices, and methods of the described embodiments may be capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may be used to direct electronic signals between network resources, model physical network resources, transform data between physical network resources, reconfigure connections and references between network resources, and so on.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Devices may be coupled to other devices via a network for example.

IPAM Server 201 may reside on any networked computing hardware server, such as a dedicated appliance, virtual appliance, dedicated server, personal computer, workstation, server, portable computer, mobile device, personal digital assistant, laptop, tablet, smart phone, WAP phone, an interactive television, video display terminals, gaming consoles, electronic reading device, and portable electronic devices or a combination of these.

For simplicity only one IPAM Server 201 is shown but system may include one or more IPAM Servers 201. The IPAM Servers 201 may be the same or different types of servers. The IPAM Server 201 may be implemented using one or more processors and one or more data storage devices configured with database(s) or file system(s), or using multiple devices or groups of storage devices distributed over a wide geographic area and connected via a network (which may be referred to as "cloud computing"). The IPAM Server 201 may include a transmitter to transmit electronic data signals to other components and a receiver to receive electronic data signals from other components.

IPAM Server 201 may include any type of processor, such as, for example, any type of general-purpose microprocessor or microcontroller, appliance, a digital signal processing (DSP) processor, an integrated circuit, a field programmable gate array (FPGA), a reconfigurable processor, a programmable read-only memory (PROM), or any combination thereof.

IPAM Server 201 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

IPAM Server 201 may include one or more input devices, such as a keyboard, mouse, camera, touch screen and a microphone, and may also include one or more output devices such as a display screen and a speaker. IPAM Server 201 has a network or communication interface in order to communicate with other components, to access and connect to network resources, to serve an application and other applications, to transmit and receive electronic data signals, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. There may be more IPAM Servers 201 distributed over a geographic area and connected via a network.

IPAM Server 201 may store semantic labels and their corresponding address mappings within the DNS Server 202. DHCP server 204 upon receiving a DHCP request 208a (via receiver) from host client device 203 determines the appropriate IP address to hand out, and sends a reply 208b (via transmitter) to the host client device 203. DHCP server 204 may register the address with the DNS server 202 using DDNS update 210 and also update the IPAM server 201 using an update message 209. Henceforth, when host client device 203 sends messages on the network to another host client device, for example client device 203a, said host client device 203a may query the DNS Server 202 using one or more reverse DNS lookups on the parts of the address of host client device 203 and receive one or more responses 207 containing the semantic labels of host client 203.

DNS Server 202 and DHCP Server 204 may be implemented using various computer hardware configurations, as described herein with regard to IPAM Server 201. Similarly, host client 203 may be implemented using computer hardware such as a configured processor, receiver, transmitter, and data storage device, as described herein with regard to IPAM Server 201.

A network hierarchy 301, as shown in FIG. 3, may include one or more subnets 302. The host device 303 address belongs within the network 301. A domain hierarchy 304 includes one or more domains 305. The host device 303 name within the domain hierarchy 304 resolves to the host address. Domain names assigned to the hosts and the domains created for them may be managed by the IPAM, as shown in FIG. 3. In prior art solutions, the correlation of subnets to DNS domains and zones may not be one-to-one. A purpose of IPAM Server 201 is to manage the hierarchy so that a) the subnets, static addresses and network pools may be derived and deployed to one or more DHCP servers that hand out IP addresses to client host devices and b) DNS zones or groups may be derived and deployed to one or more DNS Servers 202 to associate the client host device IP addresses with DNS names. Such a hierarchy typically enables IPAM Server 201 to optimize the scarce IPv4 subnet resources. IPv6 resources may not be subject to the same limitations and therefore similar treatment of IPv6 addresses in current IPAM systems underutilizes the potential of IPv6. Each semantic label 401 corresponds to underlying network hardware resources.

FIG. 4 illustrates a network tree 402 and domain tree 403 with semantic labels 401 representing the nodes in the network tree. Embodiments described herein may involve assignment of meaningful labels that may be mapped into the IP subnets and host addresses. This may allow the network nodes with access to the mapping to be able to determine the semantic labels, given an IP address. Embodiments described herein may be applicable to IPv6 addresses which are large enough to support many levels of semantic labels, but may also be applied to IPv4 addresses in a more limited fashion.

A hierarchical organizational chart may be utilized by embodiments described herein. As shown in FIG. 5, such a hierarchical organizational chart may include a root node 501, location-dependent nodes 502, and abstract nodes such as node 503 and leaf nodes such as node 504. The leaf node 504 may be assigned to host members in a collection, such as a table 505, and each host associated with a network address. In the example hierarchical organizational chart shown in FIG. 5, each node may be identified by a semantic label, the root node represents the network and the location-dependent nodes represent the subnets. A host client may be easily added to the network (for example, 'Alex') using the semantic labels (for example, 'advertising', 'marketing', 'eastcoast') by mapping the IP address using the hierarchy of semantic labels. Other types of hierarchical organizational charts may be integrated in, and utilized by, embodiments of the computer systems, computer devices, and computer implemented methods.

In another aspect of embodiments described herein, semantic label mapping applied by the systems, devices, and methods may encourage abstraction of the network hierarchy independent of the addresses. Therefore, such semantic label mapping may be used to restructure existing IPv4 networks and facilitate the migration to IPv6 networks. For example, a hypothetical company organization (for example, FIG. 5) may serve as a template for the semantic labels in the semantic hierarchy. Corresponding IPv4 and IPv6 network addresses may be composed that reflect this hierarchy, and this process may be automated. It is likely that the physical routers in the network may be geographically located and may not correspond to the nodes in the hierarchy, so that messages for different node addresses may have common routes through the same router. It is also possible that IPv4 and IPv6 messages use different sets of routers and therefore there may not be an IPv4/IPv6 one-to-one correspondence at the address subnet level. Nonetheless, modifications in the hierarchy or in the clients under a leaf node 504 may lead to a different re-composition of the address space for IPv4 or IPv6 or both, which means that although the individual network clients may receive different IP addresses from before, the semantic-label relationship of the IPv4 and IPv6 addresses with the company organization may be the same. Re-composition of the address space may correspond to re-modelling of the hierarchy of physical network resources.

Embodiments may incorporate multiple operations for the purpose of defining IPv6 addresses. Some of these embodiments are discussed herein by way of example, and other operations for the purpose of defining IPv6 addresses may be incorporated in various embodiments.

IPAM Server 201 may implement decomposition of the network numbering into a hierarchy of named blocks. Decomposition may refer to deconstructing or breaking down of the network into parts. There may be alternative words used to refer to decomposition. The network hierarchy model may allow an IP address to be annotated with information that aids in understanding the network relationships expressed by the IP address, recollection of network relationships, and representation of the network relationships in a more meaningful way. IP addresses may carry information regarding the various subnets and relationships between them. IP addresses therefore themselves may be decomposed or deconstructed. Accordingly, decomposition may follow from the logic that defines IP addresses. The difference is that the network hierarchy model described herein may allow the encoding of the different level subnets, such that the decomposition or deconstruction of such an annotated IP address results in a hierarchy of named blocks. This hierarchy of named blocks may then be used by other applications. The hierarchy of named blocks provides a set of data elements that can be accessed by other applications. Embodiments described herein provide benefits and advantages such as for example, extending the usefulness of this hierarchy by allowing the decomposition to be used by other applications. For example, according to some embodiments, the IPAM system provides functionality to enhance other application features by exporting and saving a representation of the semantic label decomposition of the hierarchy of blocks into a generally accessible directory system, such as the DNS.

In an alternative embodiment data storage hardware configuring a database or a LDAP server [LDAP] may be used as a repository for said decomposition, from where it may be used by third party applications. For example, applications receiving network messages may be able to determine the semantic labels associated with the IP addresses of the messages and process the messages according to rules related to the semantic labels.

The following provides an example of activities of various embodiments. Other activities and means of achieving activities in embodiments are possible.

Referring now to FIG. 13 there is shown a process 1300 for managing IPv6 and IPv4 addresses within an IPAM 201 device.

At 1302, IPAM 201 defines a root block. A root block may also be referred to as a top level subnet.

According to some embodiments, the root block may be defined as follows:

| Action | add_root |
|---|---|
| Subnet | FC00:1234:5600::/40 |
| Semantic prefix | Mycompany |
| DNS domain | Yes |
| Type | Absolute |

Accordingly, the root block may be defined using a data structure (stored at a persistent store) with various fields or labels and corresponding values. The values may be used to identify the block as being a root block (e.g. add_root).

At 1304, IPAM 201 defines one or more subnet blocks. One or more of the (next level) subnet blocks may be defined as follows:

| Action | add_subnet_block |
|---|---|
| Subnet | mycompany:1::/48 |
| Semantic prefix | Eastcoast |
| DNS domain | Yes |
| Type | Relative |

Similarly, a next level subnet block may be defined using a data structure (stored at a persistent store) with various fields or labels and corresponding values. The values may be used to identify the block as being a next level subnet block.

At 1306, IPAM 201 generates a network hierarchy model by layering the one or more subnet blocks to a plurality of levels. Layering may also be referred to as nesting. Layering may refer to the fact that each subnet may be a subnet of the one in the layer above.

IPAM 201 stores the root block, the one or more subnet blocks, and network hierarchy model at a persistent data store.

Subnet blocks may be arranged and layered in nested layers where each subnet includes the subnet below it to an arbitrary number of levels, up to a practical maximum. The arbitrary number of levels for layering of subnet blocks may be determined by the number of bits available for assignment in the subnet address as follows:

| Action | add_subnet_block |
|---|---|
| Subnet | mycompany:eastcoast:1::/56 |
| Semantic prefix | Marketing |
| DNS domain | Yes |
| Type | Relative |

At 1308, IPAM 201 determines subnet groups of one or more IP addresses for assigning to network clients. At 1310, IPAM 201 allocates the one or more addresses to said determined one or more subnet groups to form a subnet suffix.

Subnet groups from which the individual addresses may be allocated may be determined as follows:

| Action | add_subnet_block |
|---|---|
| Subnet | mycompany:eastcoast:marketing:1::/64 |
| Semantic prefix | Design |
| DNS domain | Yes |
| Type | Relative |

| | |
|---|---|
| Action | add_subnet_block |
| Subnet | mycompany:eastcoast:marketing:2::/64 |
| Semantic prefix | Advertising |
| DNS domain | Yes |
| Type | Relative |

| | |
|---|---|
| Action | add_subnet_block |
| Subnet | mycompany:eastcoast:marketing:3::/64 |
| Semantic prefix | Administration |
| DNS domain | Yes |
| Type | Relative |

In some embodiments, the semantic labels may be distinguishable from numbers so they may a) contain a letter which is not in the [0-9a-fA-F] range or b) start with an identifier to indicate that this is a semantic label, for example the character '$' or ':'. Semantic labels may be meant to convey a semantic meaning or context. The semantic label may be something that an operator can remember, as it may signify a logical relationship to the operator, as explained elsewhere.

Semantic Prefix: Interface Range Allocation

In some embodiments, a semantic subnet prefix may be generated to represent ranges allocated within the interface bits of the address. Interface bits of the address may be lower than 64 bits.

At 1312, IPAM 201 determines a subnet prefix and combines the subnet suffix and subnet semantic prefix so that the subnet semantic prefix precedes the subnet suffix. This may result in composing the semantic label. The subnet semantic prefix may be distinguishable from numbers of the one or more individual addresses. A semantic prefix may be a semantic label appearing at the start of the subnet information.

The labeling of a range is possible as illustrated by the following example that may be incorporated in embodiments, although other methods, and means of labeling a range are possible in other embodiments. In the following example a range is specified for the provisioning of host clients under the label 'tablets':

| | |
|---|---|
| Action | add_subnet_range |
| Subnet | mycompany:marketing:4:[1234:5678::0-1234:5678:ffff:ffff] |
| Semantic Prefix | tablets |
| DNS domain | Yes |
| Type | Relative |

Storing Semantic Labels within DNS

The storage of network mapping by the systems, devices, and methods may be accomplished without modification to the operation of the DNS server.

The assignment of DNS domains to network blocks as applied in embodiments described herein may be a convenient way to simplify the task of managing local semantic labels and may be applied in embodiments. For example, an organization may choose to make certain assigned address blocks visible to internal or external users using the same categorization of semantic labels. The assignment of domains to blocks offers further advantages and benefits, such as for example it may be able to associate different, but related, IP addresses with the same semantic labels, and therefore the same domain names. For example, IPv4 and IPv6 addresses may be related by their semantic labels. Embodiments may create IPv6 as well as IPv4 addresses for each block. FIG. 9 illustrates an interface that displays a visualization of IPv6 addresses and their semantic label equivalents. The creation of IPv6 as well as IPv4 addresses for each block will enable a single hierarchy of the network to be represented by both types of addresses. This may be particularly useful in the transitioning to IPv6 networks because it does not restrict the IPv6 subnets to the limited number of bits available in the IPv4 subnets, thereby allowing for future expansion of IPv6 addresses. Furthermore, the difficulty of remembering and correctly entering the longer IPv6 addresses is avoided by using semantic labels and this may contribute to fewer errors in managing these addresses. FIG. 10 illustrates the combined IPv4 and IPv6 addresses displayed together in a single view, showing which addresses are defined for one or the other or both types.

| | |
|---|---|
| Action | add_root |
| IPv6 Range | FC00:1234:5600::/40 |
| IPv4 Range | 10.0.0.0/8 |
| Semantic Prefix | mycompany |
| DNS domain | Yes |
| Type | Absolute |

In some embodiments, all mappings may be updated to a single hardware server, and the systems, devices and methods may create a top level domain with a distinct name, for example, such as "NETMAP". A second level domain with a distinct name may further be created, for example, such as "SUBNET". For each subnet forward and reverse records may be created to map semantic labels to subnet prefixes and vice-versa. For example, this method may be applied to create TXT records for subnets, A records for IPv4 and AAAA records for IPv6 addresses. Domains may be made visible to all users or to limited groups of users, and DNSSEC security may also be used to authenticate the DNS responses.

Using a Structured Format to Describe the Network

In further embodiments, a structured text format may be utilized to represent the reverse network mapping. For example, the structured text format may be the JSON standard, or any other structured text format. The structured text format may allow for self-describing formats to be supported. FIG. 6 shows an illustration of structured data storage in DNS.

Uses of Semantic label Mapping

The semantic label mapping disclosed herein may be applied for a variety of uses. Some examples of such uses are described herein to further define and describe embodiments and applications thereof. These are illustrative examples and other uses are also possible.

1. Pv4 to IPv6 Transition

The use of embodiments in an IPAM server 201 for facilitating the transition from IPv4 networks to IPv4 and IPv6 networks may involve the following: a) the creation of the semantic hierarchy using hardware processors (and storage using a persistent store), which may be based on an existing hierarchy, such as the existing network hierarchy or on a different hierarchy, for example, the organization shown in FIG. 5; b) the discovery of IPv4 hosts in the existing network, as may be done by including previously known hosts, static assignments, self-registration as described herein and address assignments by DHCP based on network location; c) re-assigning hosts to leaf nodes according to rules based on the new semantic hierarchy. In some cases this may result in changes to the current or future IPv4 addresses of the hosts; d) creating DNS domains for the subnets and hosts to reflect the semantic labels, as described herein; e) determining the network address or addresses of the IPv6 root block, which may be set by an Internet Service Provider and f) generating the IPv6 subnets and addresses that correspond to the semantic labels, preferably by automated means. g) Deploying the new DHCP, DHCPv6 and DNS entries to the appropriate servers.

Referring now to FIG. 14 there is shown a process 1400 for restructuring existing IPv4 networks and migrating to IPv6 networks within an IPAM 201.

At 1402, IPAM 201 generates a semantic hierarchy independent of network addresses into branch and leaf nodes.

At 1404, IPAM 201 assigns a semantic label to each node in the hierarchy. IPAM 201 stores the semantic labels and the hierarchy in a persistent store.

At 1406, IPAM 201 matches each node with an existing IPv4 subnet and creates a new subnet when one does not already exist.

At 1408, IPAM 201 matches existing known host client devices 203 with leaf nodes of the hierarchy.

At 1410, IPAM 201 reassigns host client device 203 to leaf nodes according to rules based on the new semantic hierarchy. Example rules are described herein.

At 1412, IPAM 201 determines the network address of the IPv6 root block and associate it with the root node. The IPAM Server 201 may extract this information from the IP address.

At 1414, IPAM 201 generates IPv6 subnets and host address definitions corresponding to the node hierarchy. IPAM 201 stores the IPv6 subnets at the persistent store.

At 1416, IPAM 201 deploys host address definitions to the DHCP and DHCPv6 servers.

2. Log Expansion

The appearance of a network address in a log file can cause the data to be difficult to interpret. This problem is exacerbated when IPv6 addresses are used due to the complexities of such address, as is discussed herein. In addition, a host client may be using more than one IP address, and therefore correlation between the addresses may be important and useful. FIG. 7 illustrates a log record that may be captured using prior art. Note that the IPv6 addresses are particularly hard to memorize. FIG. 8 illustrates how the same record may appear after semantic label mapping has been applied in accordance with the present invention to the IP addresses present in the log record. Accordingly, embodiments described herein involve data transformations for records. The mapping process may include a) identifying the IP addresses in the log record, b) querying the data store, such as DNS Server, to obtain the semantic label mappings and c) replacing the instances of IP addresses in the log record with third semantic equivalent labels. IP address information may be received in non-annotated form (as part of networking operations). To implement networking operations in the system, a mapping may be performed, whereby the IP address is converted to the annotated form by following the steps of the process described herein.

Access to name mapping data generated may generally allow a logging system to distinguish between different addresses and provides a significant improvement in clarity. Over time, the IP addresses used may change and the network groups may be reallocated. However, the inclusion of semantic labels in the logs, in accordance with embodiments may facilitate name-based searches, allowing auditing of historical data to be done after the fact as well as across data sets from different dates.

3. User and Group Identification

DNS reverse name lookup is commonly used to identify users. Embodiments described herein function in a manner that extends beyond the prior art DNS reverse name lookup function. Embodiments described herein allow the receiver of a network message to determine the group or groups to which the sender belongs. It allows more useful data to be obtained by monitoring network traffic. For example, statistics on which groups, for example 'sales', make most use of certain web sites may be determined by tracking the source addresses of messages to those sites and categorizing the addresses using semantic labels for the groups in question. Network activities may be filtered more easily by relying on the semantic labels. The semantic labels may be searched or filtered, and based on this the network operations associated with the IP addresses carrying the semantic labels. This may provide a new, more efficient way to track specified network activities.

A determination of the group or groups to which the sender belongs may also be used to enhance the responsiveness of the system by providing services tailored to the sender's group. For example, a web site may use the group affiliation, such as 'sales', to direct the sender to an initial web page consistent with that group, thereby eliminating the need for the user to enter a selection.

Embodiments may be used to substitute human readable semantic labels for IP addresses.

Referring now to FIG. 15 there is shown a process 1500 for representing network addresses in human readable form as semantic labels. The semantic labels may relate to groups.

At 1502, IPAM 201 automatically identifies, using a processor, an IP address segment.

At 1504, IPAM 201 queries a persistent data store for the IP address.

At 1506, IPAM 201 receives (via a hardware receiver) a semantic label representation of the IP address segment from the persistent data store.

At 1508, IPAM 201 automatically replaces the IP address segment in context with the semantic label representation.

Referring now to FIG. 16 there is shown a process 1600 for user and group identification.

At 1602, IPAM 201 receives (at a receiver) the IP address of the client 203.

At 1604, IPAM 201 queries a persistent data store for the IP address.

At 1606, IPAM 201 receives (at the receiver) the semantic label representation of the IP address from the persistent data store.

At 1608, IPAM 201 determines the group from the semantic label.

4. Content Provisioning

Embodiments may generate knowledge and/or data that may assist the receiver to present context-appropriate information, for example, such as marketing information, to the sender, even if the exact user is not known to the receiver. A site may further choose to hide information not intended for a particular group of senders. Furthermore, use may be made of embodiments to determine the nature of the user device and to adjust service policies accordingly. Policies may be changed just for a group of users, using the associated IP address information, because the relevant IP address information can be encoded (as described with user group information). For example, extremely large documents may be prevented from being sent to mobile clients by determining the semantic labels associated with the destination address of each client and then applying a set of rules to determine whether restrictions for the said semantic labels apply to the said documents.

5. Firewall and Routing

Routing and network access will benefit from semantic labels generated by embodiments described herein because of the efficient way addresses are mapped into defined groups. For example, embodiments may match all addresses that contain a mapping into the 'design' block for source addresses.

As another example, embodiments may link to or integrate routing tables that may be set up with static routes to improve security of routes and routing performance. The use of semantic labels generated may provide a means and/or method for static routes to be defined and managed using the IPAM of the systems, devices and methods implemented in accordance with the embodiments described herein. Therefore, the specification of a route based on the semantic label may be automatically resolved to its corresponding IP address and added to the routing table without the network administrator having to enter numeric addresses directly. Source-based routing, which is part of a Policy-based routing, may not be easy to configure. Embodiments described herein may be used to translate routing policies that specify semantic labels into routing rules that specify IP addresses, whereupon said rules may be set within the routing system. Policies may be defined as simply as "my network will not carry traffic from the engineering department" or as complex as "traffic originating within my network with the following characteristics will take path A, while other traffic will take path B", whereby, using embodiments described herein, 'characteristics' may be defined by the semantic labels.

Referring now to FIG. 17, there is shown a process 1700 for implementing network administration rules for firewall routing.

At 1702, IPAM 201 defines a network routing rule using one or more semantic label expressions to represent source and destination network addresses and subnets.

At 1704, IPAM 201 queries for the semantic labels.

At 1706, IPAM 201 receives (at a receiver) the network address and subnet representations of the semantic labels.

At 1708, IPAM 201 substitutes the network addresses and subnets for the semantic labels in the rule.

6. At 1710, IPAM 201 Implements the Rule in the Firewall.Access Control.

Access to application and network resources, for example, such as web pages, can be coordinated through the use of semantic labels generated by embodiments described herein. This is preferable to coordination based on IP addresses as may be used with other approaches. Coordination through the use of semantic labels generated by embodiments described herein may this allow groups of users to be more accurately determined. It further provides a layer of abstraction from the network numbering. For example, in a healthcare environment, only client hosts with IP addresses that are labelled from specific departments or groups may be given access to servers containing clinical data. This may be applied at various stages, including a) DNS servers may use the semantic labels of the querying host to determine whether the querying client should be able to 'see' the requested resource, b) networks routers and firewalls may permit or block access to the clinical servers on the basis of semantic labels, and c) servers holding sensitive data may cloak or restrict some or all of their data from client hosts with IP addresses that do not match required semantic labels.

Although this use of semantic labels is not a substitute for network authorization, it is beneficial in providing a filter for unauthorized clients and preventing certain kinds of network attacks, such as denial-of-service. The use of semantic labels may be particularly beneficial in reducing the set of authentication candidates to a more manageable size and may exclude unworthy candidates quickly and inexpensively. This may allow for a more rigorous authentication method to be employed. For example, medical users may use predefined certificates stored in a particular database that is associated with the caregiver's semantic label, whereas non-medical users may be authenticated using a different, less efficient method.

7. Semantic Provisioning

Provisioning of a client host on a network is often a two step process. In the first step the client or an administrator may access an IP Address management (IPAM) facility on the system to a) authenticate his/her credentials with the system and b) reserve an IP address for the host or set up an entry in an address pool for the host identified by a unique attribute of the host, such as a MAC address or a host device identifier. In the second step the client host may use the well known DHCP or DHCPv6 protocol to request the IP address that is assigned to the said host. This invention enables the client or administrator to specify the user-meaningful semantic labels in the first step in order for the said facility to look up and select the subnet and address pool from which to allocate and hand out the address in the second step. For example, the client may make a reservation for 'westcoast', 'marketing' and 'admin labels to which the address handed out may correspond. The user may also provide a device identifier that allows the device to be allocated to a specific, labelled address pool, such as 'tablets'. FIG. 11 illustrates different kinds of addresses associated with semantic labels. FIG. 12 illustrates the allocation of address ranges with a semantic label. In a further aspect of embodiments, the semantic labels may be derived or computed from attributes in an independent data source, for example a user database, so that the said labels may be already partially or fully specified, thereby facilitating the provisioning of the host device. The semantic labels may not need to be established using the discretion of a network manager. The labels may exist already in an existing database. For example an organization chart, a database of users (and associated groups), and so on.

In another example, a student on campus may use a self-registration portal to register her laptop computer. When signing on she may be automatically identified as a 2nd year, science student in fulltime study. Therefore the semantic labels 'year2', 'science', 'fulltime' and 'maincampus' may be assigned to her resulting in an IP address pool representative of this. Thereafter, when she boots up her laptop computer she may receive an IP address from this said pool of addresses. Sites on the campus network that she visits may therefore be able to identify her by semantic labels by referencing the DNS system and may be able to improve their services to her, for example, by displaying web pages containing information only relevant to Science students.

Figure 18:
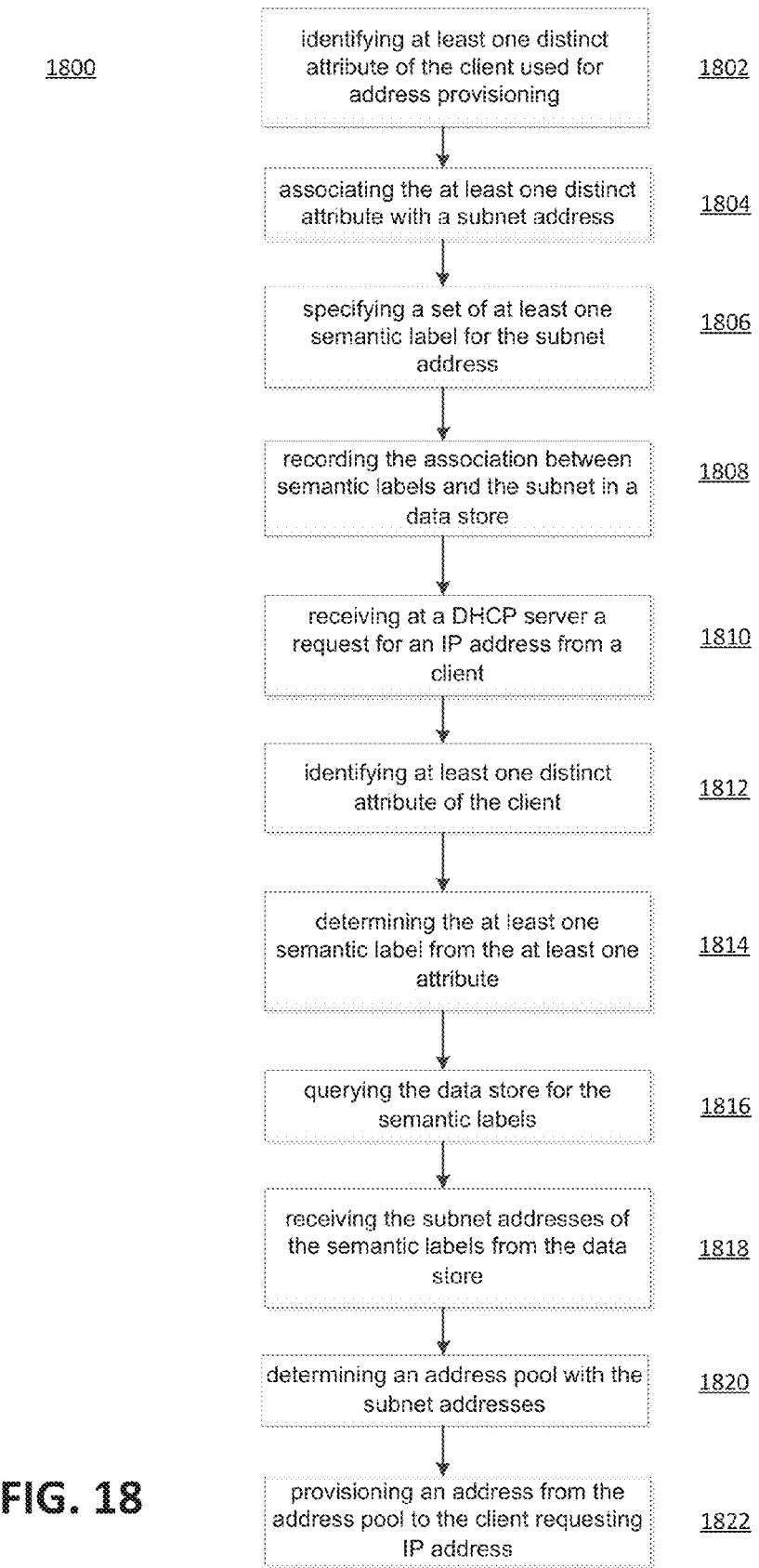

Referring now to FIG. 18 there is shown a process 1800 for using a DCHP server to provision a client network IP address to map to a semantic label.

At 1802, IPAM 201 identifies at least one distinct attribute of the client used for address provisioning.

At 1804, IPAM 201 associates the at least one distinct attribute with a subnet address.

At 1806, IPAM 201 specifies a set of at least one semantic label for the subnet address.

At 1808, IPAM 201 records the association between semantic labels and the subnet in a data store.

At 1810, IPAM 201 receives at a DHCP server a request for an IP address from a client 203.

At 1812, IPAM 201 identifies at least one distinct attribute of the client. At 1814, IPAM 201 determines the at least one semantic label from the at least one attribute.

At 1816, IPAM 201 queries the data store for the semantic labels.

At 1818, IPAM 201 receives the subnet addresses of the semantic labels from the data store.

At 1820, IPAM 201 determines an address pool with the subnet addresses.

At 1822, IPAM 201 provisions an address from the address pool to the client requesting IP address.

It will be appreciated that other variations of the embodiments described herein may also be practiced. Other modifications are therefore possible.

We claim:

1. A method within an IP address management (IPAM) system for restructuring existing IPv4 networks migrating to IPv6 networks, said method comprising the following steps:
   generating, using a processor, a semantic hierarchy independent of network addresses into branch and leaf nodes, the semantic hierarchy corresponding to an organizational chart;
   assigning a semantic label to each node in the semantic hierarchy based on the corresponding organizational chart;
   storing the semantic labels and the semantic hierarchy in a persistent store;
   identifying existing IPv4 host devices within the existing IPv4 networks;
   assigning, using the processor, the existing IPv4 host devices to leaf nodes of the semantic hierarchy;
   determining, using the processor, an IPv6 network address of the IPv6 root block and associating the IPv6 network address with a root node of the semantic hierarchy;
   generating, using the processor, IPv6 subnets and host addresses for the existing IPv4 host devices according to the semantic hierarchy, and the IPv6 network address associated with the root node of the semantic hierarchy; and
   deploying the generated IPv6 subnets and host addresses to DHCPv6 servers.

2. The method of claim 1, further comprising the step of creating domain names for the IPv6 subnets and host addresses to reflect the semantic labels assigned to the semantic hierarchy and deploying the domain names to a DNS server.

3. A method of using a DHCP server for provisioning a network client device with a network IP address that maps to at least one semantic label, the method comprising:
   identifying at least one distinct attribute of a network client device, the network client device being an IPv4 device on an existing IPv4 network;
   determining at least one semantic label for the at least one distinct attribute, the at least one semantic label assigned to a node in a semantic hierarchy, the semantic hierarchy corresponding to an organizational chart;
   recording an association between the at least one semantic label and a subnet address in a persistent data store based on the semantic hierarchy;
   receiving at a DHCP server a request for an IP address from the network client device;
   querying the persistent data store for the at least one semantic label;
   receiving the subnet address using the association with the at least one semantic label from the persistent data store;
   determining an address pool containing the subnet address; and
   provisioning an IP address from the address pool to the requesting network client device.

4. An IP address management (IPAM) system for restructuring existing IPv4 networks migrating to IPv6 networks, the system comprising:
   a persistent store;
   a processor configured to:
      generate a semantic hierarchy independent of network addresses into branch and leaf nodes, the semantic hierarchy corresponding to an organizational chart;
      assign a semantic label to each node in the semantic hierarchy based on the corresponding organizational chart;
      store the semantic labels and the semantic hierarchy in the persistent store;
      identify existing IPv4 host devices within the existing IPv4 network;
      assign the existing IPv4 host devices to leaf nodes of the semantic hierarchy;
      determine an IPv6 network address of the IPv6 root block and associating the IPv6 network address with a root node of the semantic hierarchy;
      generate IPv6 subnets and host addresses for the existing IPv4 host devices according to the semantic hierarchy and the IPv6 network address associated with the root node of the semantic hierarchy; and
      deploy the generated IPv6 subnets and host addresses to DHCPv6 servers.

5. The system of claim 4 wherein in the processor is further configured to create domain names for the IPv6 subnets and host addresses to reflect the semantic labels assigned to the semantic hierarchy and deploying the domain names to a DNS server.

6. A system for provisioning a network client device, the system comprising:
   a persistent store;
   a processor;
   a DHCP server to receive a request for an IP address from a network client device;
   wherein the processor is configured to:
      identify at least one distinct attribute of the network client device;
      determine at least one semantic label for the at least one distinct attribute, the at least one semantic label assigned to a node in a semantic hierarchy, the semantic hierarchy corresponding to an organizational chart;
      record an association between the at least one semantic label and a subnet address in the persistent data store based on the semantic hierarchy;
      query the persistent data store for the at least one semantic label;
      receive the subnet address using the association with the at least one semantic label from the persistent data store;
      determine an address pool containing the subnet address; and
      provision an IP address from the address pool to the requesting network client device.

* * * * *